(12) United States Patent
Johnson et al.

(10) Patent No.: US 12,016,330 B2
(45) Date of Patent: Jun. 25, 2024

(54) CONTAINER SYSTEM AND METHOD FOR FREEZING AND THAWING A LIQUID PRODUCT

(71) Applicant: Merck Sharp & Dohme LLC, Rahway, NJ (US)

(72) Inventors: Jeffrey Charles Johnson, West Point, PA (US); Anthony Flammino, Whitehouse Station, NJ (US); Mark Anton Petrich, West Point, PA (US); Scott McFeaters, West Point, PA (US); John H. Roosa, Jr., Rahway, NJ (US); Robert Ian Alpern, Lansdale, PA (US); Joseph W. Locurcio, Whitehouse Station, NJ (US); Matthew H. Flamm, West Point, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 310 days.

(21) Appl. No.: 17/545,118

(22) Filed: Dec. 8, 2021

(65) Prior Publication Data

US 2022/0095610 A1    Mar. 31, 2022

Related U.S. Application Data

(63) Continuation of application No. 16/326,958, filed as application No. PCT/US2017/047714 on Aug. 21, 2017, now abandoned.

(Continued)

(51) Int. Cl.
*A01N 1/02* (2006.01)
*A61J 1/00* (2023.01)
(Continued)

(52) U.S. Cl.
CPC ......... *A01N 1/0268* (2013.01); *A01N 1/0263* (2013.01); *A01N 1/0273* (2013.01);
(Continued)

(58) Field of Classification Search
CPC .. A01N 1/0268; A01N 1/0263; A01N 1/0273; A61J 1/00; B65D 81/00;
(Continued)

(56) References Cited

U.S. PATENT DOCUMENTS 3,479,839 A   11/1969   Scott
3,586,097 A   6/1971    Bender et al.
(Continued)

FOREIGN PATENT DOCUMENTS

WO   2004026661 A1   4/2004
WO   2007065141 A2   6/2007
WO   2007065142 A2   6/2007

OTHER PUBLICATIONS

Applied Bioprocess Containers, "Introduction and Capabilities Overview," presentation, Apr. 29, 2013.
(Continued)

*Primary Examiner* — Len Tran
*Assistant Examiner* — Kamran Tavakoldavani
(74) *Attorney, Agent, or Firm* — Grady L. White; Potomac Law Group, PLLC

(57) ABSTRACT

Container system and method for freezing (and subsequently thawing) a liquid such as a drug substance, such that all containers in a set have a uniform width, hence uniform freeze-path length, in the widthwise direction and perpendicular to major walls of the containers, irrespective of the particular length, height, and volumetric capacity of the various containers in the set. This leads to uniform freezing performance and thereby reduces cryoconcentration. The system also eliminates or reduces ice-bridging, and the
(Continued)

potential for containers rupturing during freezing and thawing operations.

12 Claims, 12 Drawing Sheets

Related U.S. Application Data

(60) Provisional application No. 62/378,800, filed on Aug. 24, 2016.

(51) Int. Cl.
    *B65D 81/00*     (2006.01)
    *B65D 81/02*     (2006.01)
    *B65D 81/18*     (2006.01)
    *B65D 81/24*     (2006.01)
    *F25D 11/00*     (2006.01)

(52) U.S. Cl.
    CPC ............... *A61J 1/00* (2013.01); *B65D 81/00* (2013.01); *B65D 81/027* (2013.01); *B65D 81/18* (2013.01); *B65D 81/24* (2013.01); *F25D 11/003* (2013.01)

(58) Field of Classification Search
    CPC ...... B65D 81/027; B65D 81/18; B65D 81/24; F25D 11/003; F25D 17/04; F25D 2331/8014; F25D 2500/04; F25D 2600/06
    See application file for complete search history.

(56) References Cited

U.S. PATENT DOCUMENTS

| | | | |
|---|---|---|---|
| 3,684,234 | A | 8/1972 | Clinebell |
| 5,535,598 | A | 7/1996 | Cothern et al. |
| 6,453,683 | B1 | 9/2002 | Wisniewski et al. |
| 6,698,213 | B2 | 3/2004 | Voute et al. |
| 7,228,688 | B2 | 6/2007 | Voute et al. |
| 7,353,658 | B2 | 4/2008 | Voute et al. |
| 8,177,123 | B2 | 5/2012 | Voute et al. |
| 8,863,532 | B2 | 10/2014 | Voute et al. |
| 9,301,520 | B2 | 4/2016 | Cutting et al. |
| 9,920,970 | B2 | 3/2018 | Arnitz et al. |
| 10,077,136 | B2 | 9/2018 | Tresso et al. |
| 2003/0066295 | A1 | 4/2003 | Wisniewski et al. |
| 2003/0080126 | A1* | 5/2003 | Voute ................ A61M 1/0281 220/9.4 |
| 2007/0240432 | A1 | 10/2007 | Voute et al. |
| 2008/0314052 | A1 | 12/2008 | Shin |
| 2010/0273264 | A1 | 10/2010 | Stout et al. |
| 2010/0281886 | A1* | 11/2010 | Shaham ............... A01N 1/0263 62/51.1 |
| 2011/0120151 | A1 | 5/2011 | Cutting et al. |
| 2011/0120667 | A1 | 5/2011 | Cutting et al. |
| 2015/0360815 | A1 | 12/2015 | Tresso et al. |

OTHER PUBLICATIONS

Becker et al., "Heat transfer coefficients for forced-air cooling and freezing of selected foods," International Journal of Refrigeration, vol. 27, pp. 540-551. 2004.
Bezawada et al., "Use of Blast Freezers in Vaccine Manufacture," BioProcess International, pp. 42-51, Oct. 2011.
Bhatnagar et al., "Protein Stability During Freezing: Separation of Stresses and Mechanisms of Protein Stabilization," Pharmaceutical Development and Technology, vol. 12, pp. 505-523, 2007.
Cao et al., :"Effect of Freezing and Thawing Rates on Denaturation of Proteins in Aqueous Solutions," Biotechnology and Bioengineering, vol. 82, No. 6, pp. 684-690, Jun. 2003.

Charter Medical Ltd., "Validation of the New Single-Use Freeze-Pak STS: Storage and Transport Solution Containers," product brochure, 2016.
Charter Medical, Ltd., "Freeze-Pak," Product specification sheet, 2017.
Chatterji, "Aspects of the freezing process in a porous material-water system Part 1. Freezing and the properties of water and ice," Cement and Concrete Research, vol. 29, pp. 627-630, 1999.
Devireddy et al., "Measurement and numerical analysis of freezing in solutions enclosed in a small container," International Journal of Heat and Mass Transfer, vol. 45, pp. 1915-1931, 2002.
George, "Freezing processes used in the food industry," Trends in Food Science & Technology, vol. 4, pp. 134-138, May 1993.
Goldstein et al., "Disposable Freeze Systems in the Pharmaceutical Industry," American Pharmaceutical Review, pp. 1-27, Dec. 2012.
Hora et al., "Stabilisation of biopharmaceutical products and finished product formulations," Biopharmaceuticals, an Industrial Perspective, Chapter 9, pp. 217-248, 1999.
Jameel et al., "Strategies for Bulk Storage and Shipment of Proteins," Formulation and Process Development Strategies for Manufacturing Biopharmaceuticals, Chapter 27, pp. 677-704, 2010.
Kantor, "Frozen Biologic Drug Substance: You Freeze it, You Thaw it, What Could Go Wrong?," AAPS, New Orleans, Louisiana, Nov. 18, 2010.
Lashmar et al., "Bulk Freeze-Thawing of Macromolecules," BioProcess International, vol. 5, No. 6, pp. 44-54, Jun. 2007.
Naranjo et al., "Permeability Properties," Plastics Testing and Characterization: Industrial Applications, Chapter 7, pp. 263-285, Jul. 2008.
Padala et al., "Impact of Uncontrolled vs Controlled Rate Freeze-Thaw Technologies on Process Performance and Product Quality," PDA Journal of Pharmaceutical Science and Technology, vol. 64, No. 4, pp. 290-298, Aug. 2010.
Pham, "Extension to Planck's equation for predicting freezing times of foodstuffs of simple shapes," International Journal of Refrigeration, vol. 7, No. 6, pp. 377-383, Nov. 1984.
Radmanovic et al., "Understanding the Freezing of Biopharmaceuticals: First-Principle Modeling of the Process and Evaluation of Its Effect on Product Quality," Journal of Pharmaceutical Sciences, vol. 102, No. 8, pp. 2495-2507, Aug. 2013.
Rathore et al., "Current Perspectives on Stability of Protein Drug Products during Formulation, Fill and Finish Operations," Blotchenol. Prog., vol. 24, pp. 504-514, 2008.
Resende, "Experimental Measures of the Effective Heat Transfer Coefficients in Air Blast Freezers for the Processing of Fruit Pulps," Engenharia Temica, No. 3, pp. 11-18, 2003.
Ringe et al., "The 'glass transition' in protein dynamics: what it is, why it occurs, and how to exploit it," Biophysical Chemistry, vol. 105, pp. 667-680, 2003.
Sabic Innovative Plastics, "Oxygen and water permeability data," 2008.
SAFC Biosciences, "The BIOEAZE Drop Test: Impact Resistance of Water-Filled EVA (Ethyl Vinyl Acetate) Bioprocess Bags at Different Temperatures," Technical Bulletin, Nov. 2005.
Saint-Gobain Performance Plastics, "Bio-Simplex HDPE Carboys," product brochure, 2012.
Sartorius Stedim Biotech, "Celsius FT100," product brochure, date not available.
Sartorius Stedim Biotech, "Lab Scale System Overview," product brochure prepared for Merck Union, NJ, Mar. 2012.
Sartorius Stedim, "An Introduction to Celsius LFT," product brochure, Mar. 2013.
Shamlou et al., "A new scaleable freeze-thaw technology for bulk protein solutions," Biotechnol. Appl. Biochem., vol. 46, pp. 13-26, 2007.
Singh et al., "Large-Scale Freezing of Bilogics," BioProcess International, pp. 32-44, Oct. 2009.
Voute et al., "Disposable Technology for Controlled Freeze-Thaw of Biopharmaceuticals at Manufacturing Scale," BioProcess International, Supplement, pp. 40-43, Oct. 2004.
Wang et al., "Freezing, Thawing, and Chilling of Foods," Mathematical Modeling of Food Processing, Chapter 14, pp. 376-398, 2010.

(56) References Cited

OTHER PUBLICATIONS

Webb et al., "Freezing Bulk-Scale Biopharmaceuticals Using Common Techniques and the Magnitude of Freeze-Concentration," BioPharm, pp. 22-34, May 2002.

* cited by examiner

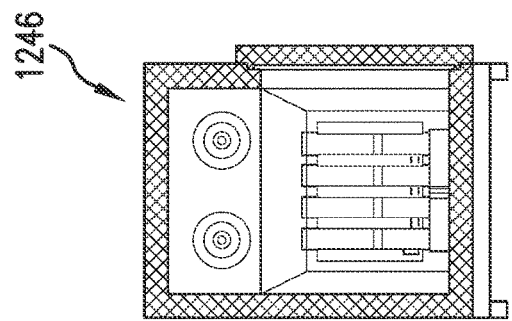
FIG. 12B
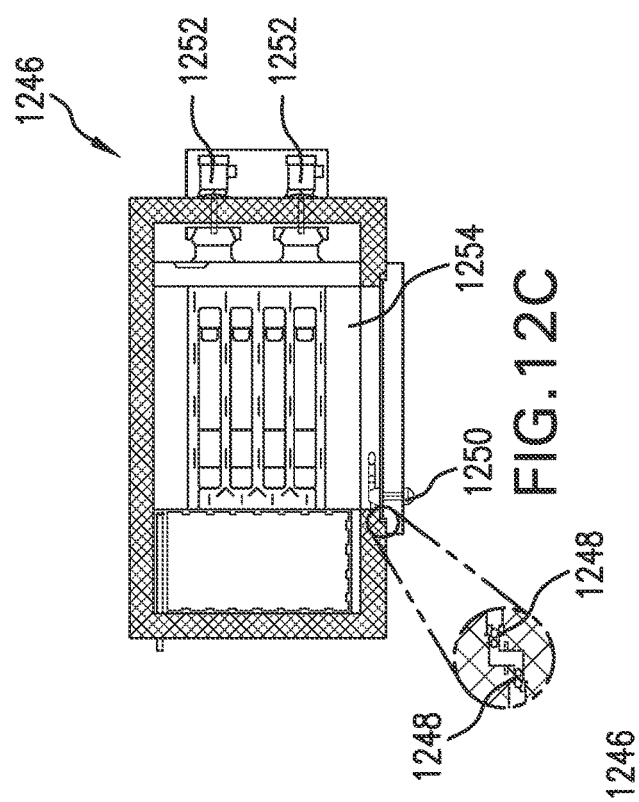
FIG. 12C
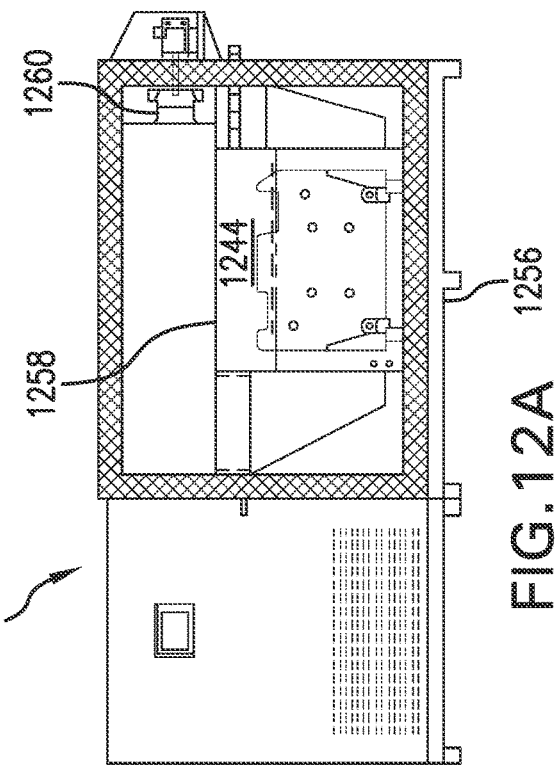
FIG. 12A
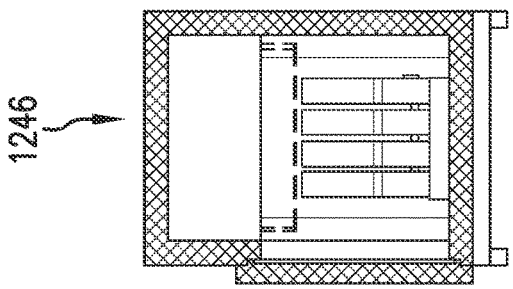

CONTAINER SYSTEM AND METHOD FOR FREEZING AND THAWING A LIQUID PRODUCT

FIELD OF THE INVENTION

In general, the present disclosure relates to a system and method for processing liquid bulk drug substances and other pharmaceutical solutions. More particularly, the disclosure relates to a system, including a set of containers and other processing apparatuses, that is particularly well suited for freezing, transporting, and subsequently thawing such substances.

BACKGROUND OF THE INVENTION

In various contexts, there is a need to freeze and thaw a liquid product in a controlled manner, and to do so while maintaining quality of the liquid product. For example, it is common to produce a drug substance such as a vaccine, biologic, or pharmaceutical product, in bulk, liquid form; transfer the drug substance in liquid form into individual containers; and then freeze the drug substance in the containers. The frozen drug substance may then be shipped to a cold-storage facility, and subsequently shipped to a final-drug production site, where it is thawed and incorporated into a drug product being produced at the drug production site.

In this context, there are at least two important reasons to exercise precise control over the process for freezing the liquid drug substance in the containers. First, non-uniform freezing can lead to cryoconcentration, where freezing (e.g., of the water molecules in a given drug-substance solution) at different rates within a given container can lead to different levels of concentration of the drug substance throughout the container. Cryoconcentration can lead to degradation of the active molecule in the drug substance prior to freezing at a given, specific location in the container.

Second, if freezing is not uniform throughout the container, it is possible for the container to be breached or ruptured as the liquid drug substance freezes. This, of course, can allow contaminants such as bacteria or bioburden to enter into the container. Considering the loss of product yield associated with a breached container—depending on its size, a given container can hold more than $100,000 worth of product—it is crucial to avoid such freezing-related container failures if at all possible.

Additionally, it is important to control the subsequent thawing process so that thawing is uniform across the entire group of solution-bearing containers being thawed at a given time. This is because uneven and/or non-uniform thawing within a given container or from container to container can lead to molecular aggregation; formation of precipitates; and/or other adverse consequences.

SUMMARY OF THE INVENTION

Embodiments of the present invention provide a system and method for freezing and subsequently thawing a liquid product, such as a liquid drug substance or other pharmaceutical solution (for example active ingredient such as chemical compound, vaccine, antibody, protein, peptide, DNA, RNA or derivatives thereof) which significantly encourages uniform freezing (and uniform thawing) of the liquid drug substance throughout the container, while substantially reducing cryoconcentration and container ruptures. In particular, this is accomplished by controlling the freezing of liquid substance so as to maintain an essentially constant freeze-path length from one container to another, irrespective of the total volume of a given container, so as to provide consistent freezing and thawing performance across a range of container sizes.

Thus, in a first aspect, the invention features a set of containers for storing therein a liquid substance which is to be frozen and thawed, with each of the containers in the set having an essentially parallelepiped configuration with a substance-receiving cavity defined by the walls of the container. Each of the containers in the set has a pair of major walls on opposite sides of the container that define a length and a height of the container, and the major walls of each of the containers are spaced apart by a distance that defines a width of the respective container. Even though the substance-receiving cavities of various containers in the set may have different volumes, all of the containers in the set have the same width, such that a freeze-path length associated with each of the containers in the set is essentially the same.

In specific embodiments, the geometric configuration of containers within the set are designed with an ice bridging number (IBN) in mind. The IBN is a dimensionless parameter that is based on comparative rates of heat transfer through the headspace above the liquid in the container and through the walls of the container in which the liquid is in contact, and that is indicative of the relative rates at which water in the solution tends to freeze 1) at the air-liquid interface, and 2) along the walls of the container. Accordingly, IBN is a function of container geometry, heat transfer areas, heat transfer coefficients, and the thermal properties of the liquid in the container before and after freezing. In some embodiments, the configuration of the containers in the set—which bears on heat-transfer rates—will be set so that the IBN is significantly less than 1 (i.e. IBN<<1) for a predetermined liquid to be frozen therein when a predetermined cooling medium is used to freeze the predetermined liquid. Typically, the geometry of the containers in a set will be configured so that the IBN is less than about 0.6, and suitably greater than about 0.1 and less than about 0.6. In other embodiments, the set of containers may all have the same internal, nominal volume, with the same width so as to keep the freeze-path length essentially uniform for all containers in the set.

In another aspect, the invention features a system for storing, freezing, transporting, and subsequently thawing a liquid substance. The system includes a set of containers as described immediately above, either with different containers in the set having different volumes or all containers in the set having the same volume, along with a container-support platform. The container-support platform includes a plurality of formations that define a plurality of container-receiving spaces, with each of the container-receiving spaces being essentially equal in width to the width of the containers, and with groups of the formations being positioned so as to support a plurality of the containers on the container-support platform, received within respective container-receiving spaces, equally spaced from each other.

In yet another aspect, the invention features a method for storing and freezing a liquid substance. The method includes introducing the liquid substance into a plurality of containers selected from a set of containers as described immediately above; disposing the liquid-containing containers on a container-support platform, with the liquid-containing containers equally spaced from each other; and causing the liquid substance contained within the liquid-containing containers to freeze, with generally uniform progression of the freeze front or freeze fronts within each of containers, by flowing a cooling medium through spaces between adjacent containers.

In specific embodiments, the headspace located above the liquid in each of the containers may be insulated with a shroud while the liquid is being frozen in order to limit heat transfer that occurs through the headspace, thereby suppressing the tendency for ice to form at the upper surface of the liquid and allowing it to form more quickly along the sidewalls of the container. In this specific embodiment, the frozen substance contained within the fluid-containing containers may subsequently be caused to thaw, with generally uniform progression of the thawing within each of containers, by flowing a heating medium through spaces between adjacent containers and, if required, while rocking the containers to mechanically agitate liquid contained therein.

In yet another aspect, the invention provides a method for thawing a frozen liquid substance. According to this aspect, a number of containers containing an amount of the frozen liquid substance are placed on a container-support platform, with the containers equally spaced from each other, and the frozen liquid substance contained within the containers is caused to thaw, with generally uniform progression of the thaw front or thaw fronts within each of the containers, by flowing a warming medium through spaces between adjacent containers.

Each of the containers has an essentially parallelepiped configuration, with frozen liquid substance contained within a substance-receiving cavity defined by the walls of the container. Each of the containers also has a pair of major walls on opposite sides of the container that define a length and a height of the container, with the major walls of each of the containers being spaced apart by a distance that defines a width of the respective container. In one embodiment, the substance-receiving cavity of at least one of the containers has a first volume and the substance-receiving cavity of at least another one of the containers set has a second volume. In other embodiments, the set of containers may all have the same internal, nominal volume, with the same width so as to promote uniformity of thawing. The substance may be mechanically agitated while it is thawing. For example, the containers may be rocked in a longitudinal direction so that liquid contained therein moves back and forth, from one end of each container to the opposite end of each container, as the frozen substance melts.

BRIEF DESCRIPTION OF THE DRAWINGS

These and Other Features of the Invention Will Become Clearer from the Detailed Description Below as Well as the Drawings, in which:

FIGS. 12A-12C illustrate liquid product being frozen in a blast-freezer using containers in accordance with the invention.

DETAILED DESCRIPTION OF EMBODIMENTS OF THE INVENTION

Figure 1:
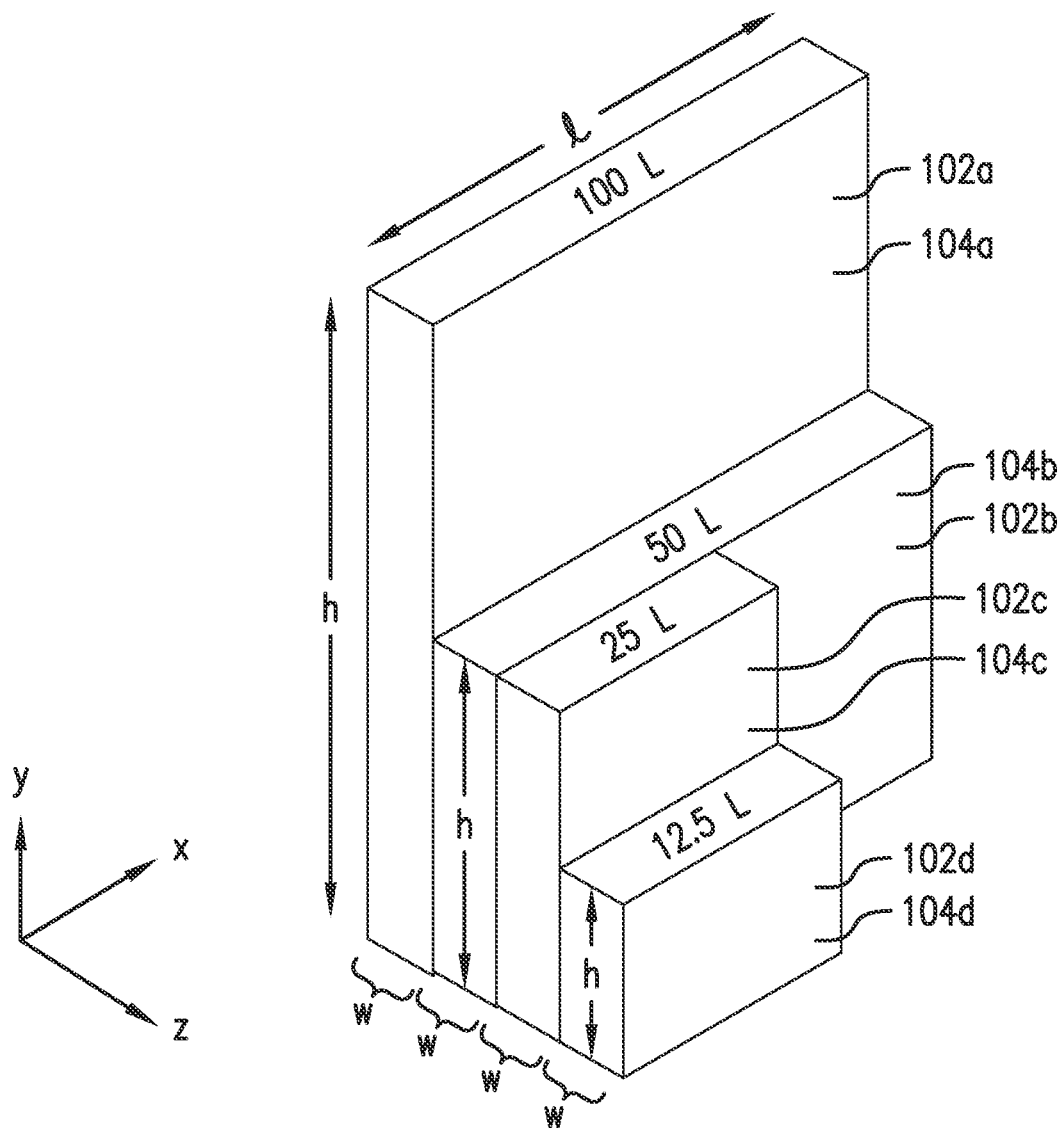
FIGS. 1 and 2 are diagrammatic representations of a set of containers in accordance with the invention.

In this disclosure, the last two digits of each reference numeral identify a given component, element, or algorithm step, and the preceding one or two digits of each reference numeral correspond(s) to the number of the figure in which the element or step is depicted. Thus, if a given element is shown in multiple figures, strictly speaking, the element will have different reference numerals in each of the several figures; however, the last two digits will be the same across all related figures being discussed at the same time in order to explain a particular concept or aspect of embodiments of the invention. If multiple figures are being addressed at the same time within this disclosure, just the reference numeral used in the lowest-numbered figure will be used in the text. Furthermore, different elements that are illustrated in different figures, which are discussed at different points within this disclosure, may have reference numerals in which the last two digits are the same; the fact that the elements are being discussed at different points in the disclosure should, however, prevent such commonality of the last two reference-numeral digits from causing confusion.

Figure 2:
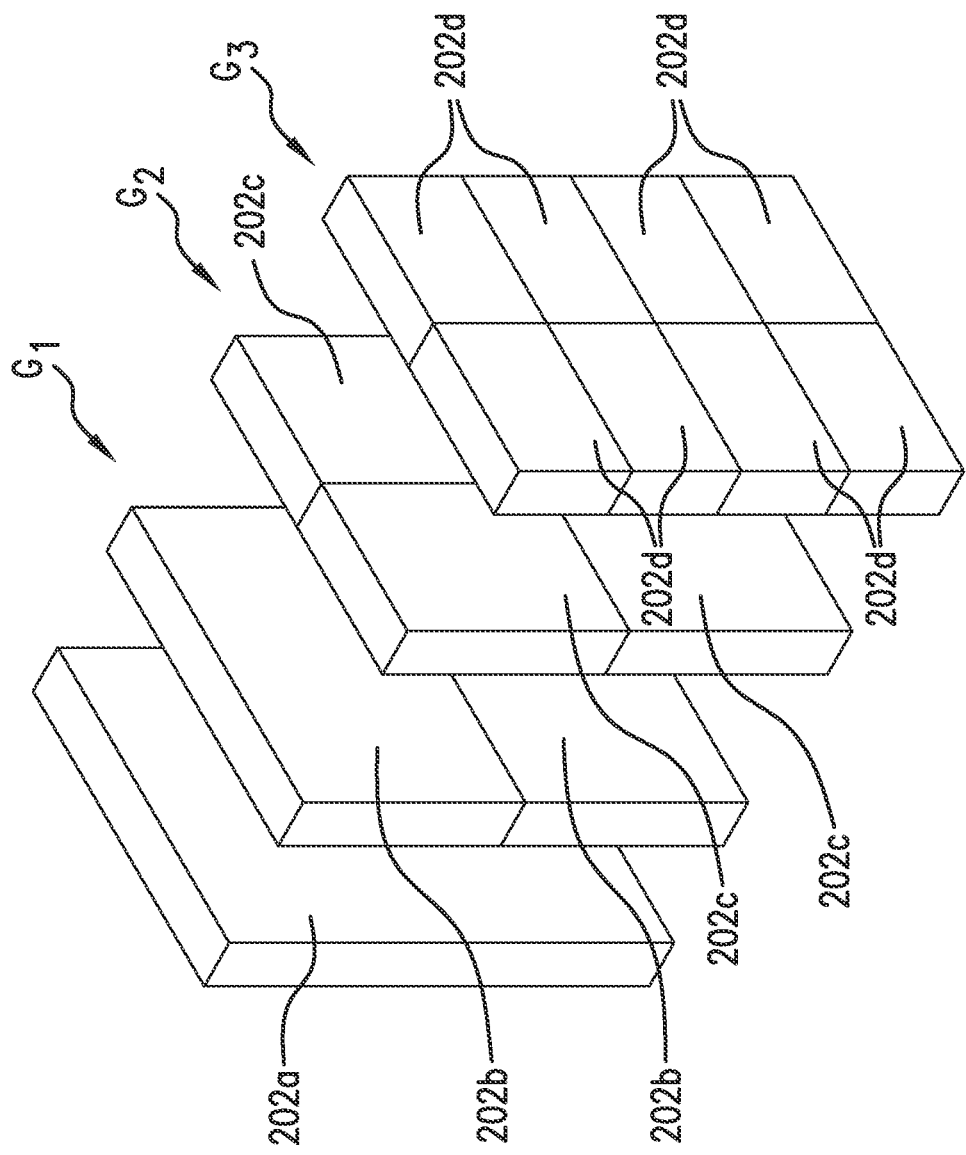

A set of containers 100 constructed in accordance with an embodiment of the invention is illustrated in FIGS. 1 and 2. As illustrated in FIG. 1, the set of containers 100 may include containers 102a, 102b, 102c, and 102d, each of which is formed by a set of walls and each of which has a different internal volume (for receiving a liquid product that is to be frozen and subsequently thawed), e.g., 100 liters, 50 liters, 25 liters, and 12.5 liters, respectively. Although the set of containers 100 illustrated in FIG. 1 has four different volumetric sizes, it will be understood and appreciated by those skilled in the art that a set of containers constructed in accordance with the invention may consist of containers with as few as two different volumetric sizes, or the set may consist of containers with five or even more different volumetric sizes. Furthermore, although just one container of each volumetric size is shown in FIG. 1, it will be appreciated that, in practice, a large plurality (e.g., on the order of tens or even hundreds) of containers of a given volumetric size may be employed in a given processing facility.

Suitably, the containers 102 are fabricated from rigid or semi-rigid plastic, which keeps their manufacturing cost relatively low. This, in turn, facilitates disposal of the containers after a single use, thereby eliminating the cost to clean and inspect containers if they were otherwise to be reused. Materials such as high-density polyethylene (HDPE) and blends of HDPE and low-density polyethylene (LDPE) are preferred. (Material selection may depend to some extent on freezing temperatures and storage conditions for the frozen product.) Furthermore, containers made from plastic such as HDPE can be gamma-irradiated to minimize the risk of bioburden contamination.

Each of the containers in the set of containers 100 has a length l in the x-direction, as illustrated, and a height h in the y-direction, as illustrated. The length l and height h of each container in the set of containers 100 are the two longest dimensions of each container, and the walls 104a, 104b, 104c, and 104d (collectively referred to as walls 104) and their respectively opposing walls—not visible given the orientation of the containers in FIG. 1, but spaced from the walls 104 in the –z direction—constitute the major walls of each of the containers in the set of containers 100. In other words, the major walls are those that have the greatest individual surface areas.

Each of the containers in the set of containers 100 also has a width w in the z-direction, by which distance w the major surfaces of a given container are spaced apart from each other. Notably, the width w is the same for all of the containers in the set of containers 100, regardless of the particular volume of the container. As addressed further below, this results in the freeze-path length associated with each of the containers 102a, 102b, 102c, and 102d in the set of containers 100 being essentially the same for all containers in the set, which permits the uniform and consistent freezing performance to be scaled up or scaled down as desired. The freeze-path length largely dictates the time for liquid solution in the containers to freeze. Having a freeze-path of essentially the same length across all of the containers 102a, 102b, 102c, and 102d affords greater control over the freezing process and results in greater uniformity of the frozen product from one container to another and tends to eliminate or significantly reduce cryoconcentration and breakage of the containers, thereby preventing contamination and reducing waste.

As further illustrated in FIG. 1, the volume of the containers in the set of containers 100 may exhibit a series of halving or other fractioning as one progresses from the largest volumetric size to the smallest volumetric size of the individual containers 102a, 102b, 102c, and 102d in the set of containers 100. For example, as illustrated in FIG. 1, the containers 102a, 102b, 102c, and 102d have volume capacities of 100 liters, 50 liters, 25 liters, and 12.5 liters, respectively. This may be achieved by halving the height of the first container 102a in the set to "obtain" the height of the second container 102b in the set; halving the length of the second container 102b in the set to "obtain" the third container 102c in the set; and halving the height of the third container 102c in the set to "obtain" the fourth container in the set. Other integer-fractions (i.e., fractions 1/n, where n is an integer) such as ⅓ or ¼ could also be used to sequentially reduce the volume of successive sizes of the containers in a set of containers. In all cases, however, the width of the containers 102a, 102b, 102c, and 102d remains the same, as noted above.

By providing a set of containers with different volumes that are integer-fractions of larger containers in the set, different numbers of multiple smaller containers can be secured together into a group G as illustrated in FIG. 2 (e.g., via a supporting "cassette" framework, not illustrated), where all of the groups $G_1$, $G_2$, and $G_3$ have the same overall or composite length and height as the volumetrically largest container 202a in the set. Additionally, although all of the containers in each of the groups $G_1$, $G_2$, and $G_3$ are the same size, it is possible for a given group G to include different sizes of containers while still maintaining the same overall or composite length and height of the group G. For example, the top two containers 202d in the left-hand column of containers in group $G_3$ could be replaced with a single container 202c, which has twice the height but the same length as the containers 202d. Or, for example, the top two rows of containers 202d (i.e., four containers) in group $G_3$ could be replaced by a single container 202b. (The specific number of containers that could be replaced by a larger container will, of course, depend on the various integers n in the various fractional relationships between consecutively sized containers.) By maintaining a uniform length and height of the various groups of containers that are to be processed (i.e., frozen or thawed), different sizes of containers can be mixed together and processed at the same time while maintaining the same degree of freezing and thawing control over all of the containers being processed.

Figure 3B:
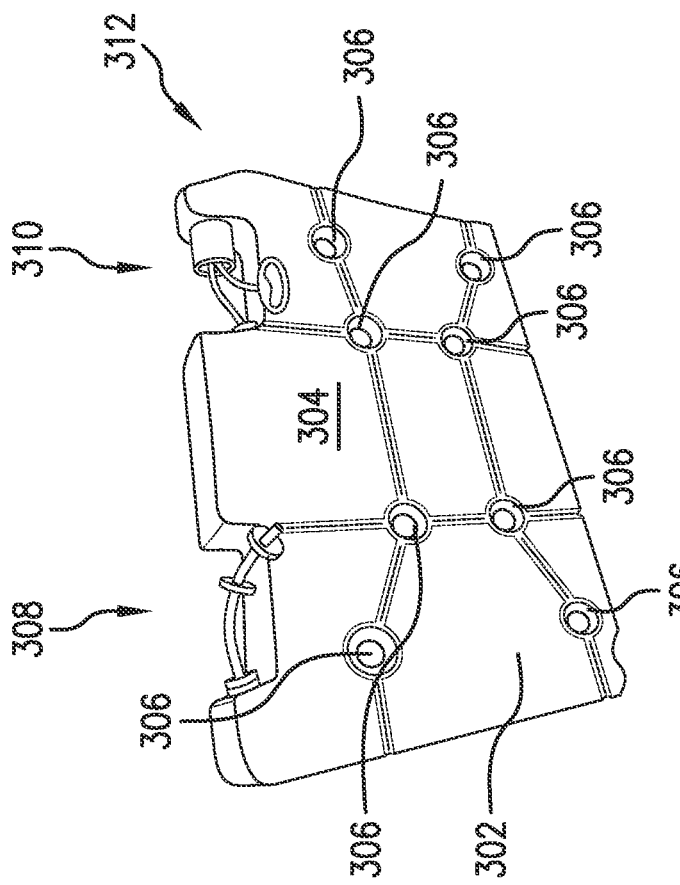
FIGS. 3A and 3B are perspective views showing a container according to the invention from two slightly different angles.
Figure 3A:
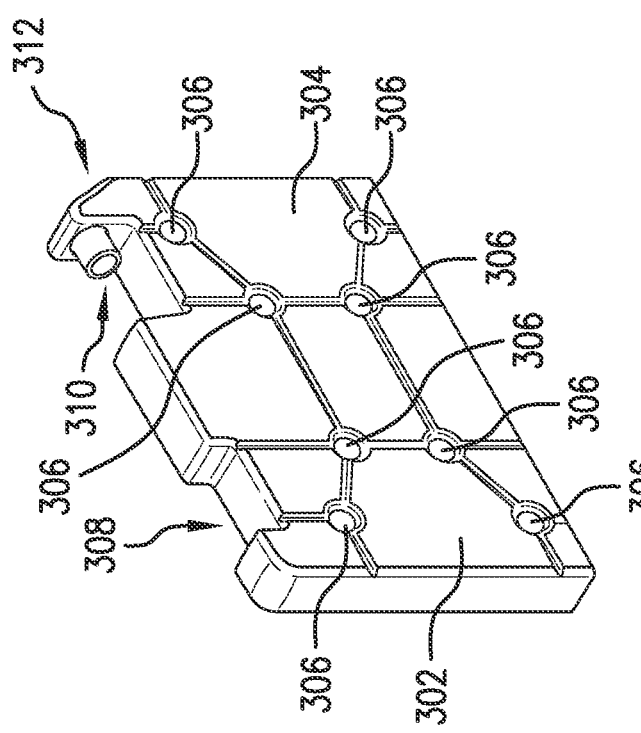

As illustrated schematically in FIGS. 1 and 2, the various containers are shown as perfectly rectangular prisms. In practice, however, this will likely not be the case. Rather, as illustrated in FIGS. 3A and 3B, the containers 302 may have various features to facilitate filling, emptying, and handling the containers at various steps in a manufacturing process.

For example, the containers 302 may have a series of apertures 306 extending inwardly from the major walls 304—perhaps even extending all the way through the entire width of the containers. These apertures 306 facilitate lifting and transporting of the containers using a lifting device (not illustrated) having a number of pins that fit into the apertures 306, either extending all the way through the apertures in the case of containers 302 with apertures 306 that extend all the way through the containers or grasping the containers 302 between opposing pins that function like pincers in the case of containers with apertures that extend only partially into the interiors of the containers 302.

Furthermore, the containers may include recesses 308, 310 along their upper peripheries to house or accommodate container-filling ports or fittings and container-emptying ports or fittings, respectively. These ports or fittings may be configured as disclosed, for example, in U.S. Pub. 2015/0360815, entitled "Phase-Change Accommodating Rigid Fluid Container" and published on Dec. 17, 2015, the contents of which are incorporated by reference. Alternatively, the ports or fittings may be configured in some other manner as may be desired, e.g., with male or female threads. Preferably, the ports or fittings are constructed to facilitate securing one or more samples of the fluid that is to be stored in the containers (e.g., a tailgate sample).

Further still, the corner 312 nearest the container-emptying port of each container 302 is suitably chamfered, i.e., angled relative to the planes of the nearest end-wall of the container 302 and the upper wall of the container 302. This chamfer feature facilitates emptying of the container 302 when liquid product is to be removed from it in terms of physically handling or manipulating the container as well as minimizing residual fluid that is unable to be removed completely from the container.

Thus, given these various structural features, containers constructed according to certain embodiments of the invention may not be perfectly prismatic. Rather, for purposes of the invention, it is sufficient for the containers to be essentially parallelepiped in construction, with the most salient feature being that the major walls of each of the containers in a set are spaced apart by the same distance w, such that the freeze-path length associated with each of the containers in the set is essentially the same.

As indicated above, maintaining a fairly consistent freeze-path length from container to container provides better control over the freezing process, with consequent reduction or elimination of variation in cryoconcentration within a given container and from container to container. It also helps avoid container rupture. In this regard, containers according to the invention are designed to reduce or eliminate cryoconcentration and container breakage by causing the liquid product that is adjacent to the major walls and the bottom wall of the containers to freeze first, with the liquid/solid interface progressing inwardly and upwardly (generally like a "U," with gradually thickening lines) when a cooling medium is flowed past both major walls and the bottom wall of the container simultaneously, or by causing the liquid product that is adjacent to one of the major walls and the bottom wall of the containers to freeze first when a cooling medium is flowed past one of the major walls. (The freeze-path length in the former case will be approximately one-half the container width, since there will be two freeze fronts that progress inwardly toward each other and meet generally in the middle of the container; the freeze-path length in the latter case will be essentially the width of the container.) This designed-to freeze dynamic is intended to avoid ice-bridging, i.e., the formation of a covering sheet of ice at the upper surface of the liquid product. Such ice-bridges tend to trap a "pocket" of liquid product in the middle of the container, which can cause the containers to bulge and break as the trapped liquid expands when freezing and then presses against the walls of the containers.

Therefore, to avoid the occurrence of ice-bridging, containers constructed in accordance with the invention may suitably be designed with an Ice Bridging Number (IBN) in mind. The Ice Bridging Number is a dimensionless parameter that can be thought of as relating the rate at which water freezes at the air-liquid interface above the product (i.e., at the bottom of the headspace above the liquid) to the rate of water displacement at the container walls, which is directly proportional to the rate of freezing along the container walls. (Leaving a portion of the container unfilled, i.e., with a small amount (e.g., 10% of the total fill capacity) of air above the liquid, limits heat transfer from, and therefore helps avoid initial freezing at, the upper surface of the liquid.) More particularly, we have defined the IBN as $$IBN = \frac{\dot{m}_{hs}}{\dot{m}_{liq}} = \frac{\text{rate of headspace freezing}}{\text{rate of liquid displacement}},$$

or $$IBN = \frac{\dot{Q}_{hs}}{\dot{Q}_{liq}\beta}$$

where
$\dot{Q}_{hs}$=rate of heat transfer in headspace;
$\dot{Q}_{liq}$=rate of heat transfer at liquid/container interface; and
β=Expansion coefficient of phase $$\text{transition} = \frac{\Delta\rho}{\rho}$$

Figure 4:
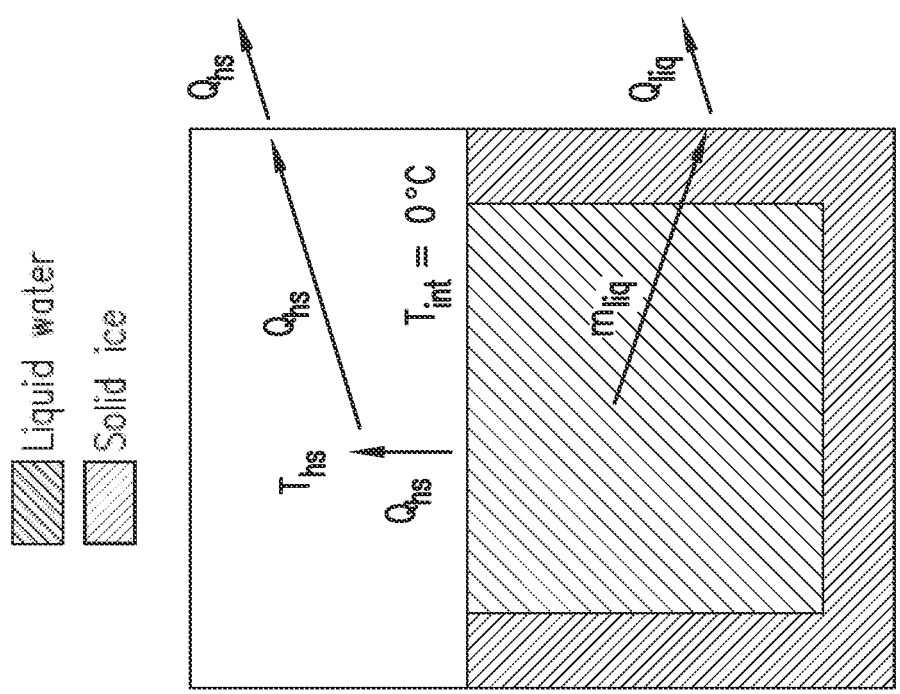
FIG. 4 is schematic diagram illustrating the energy balance associated with the freezing process within containers according to the invention.

(Various parameters used in these equations are illustrated in FIG. 4, which shows the energy balance associated with the freezing process within containers according to the invention).

Figure 5:
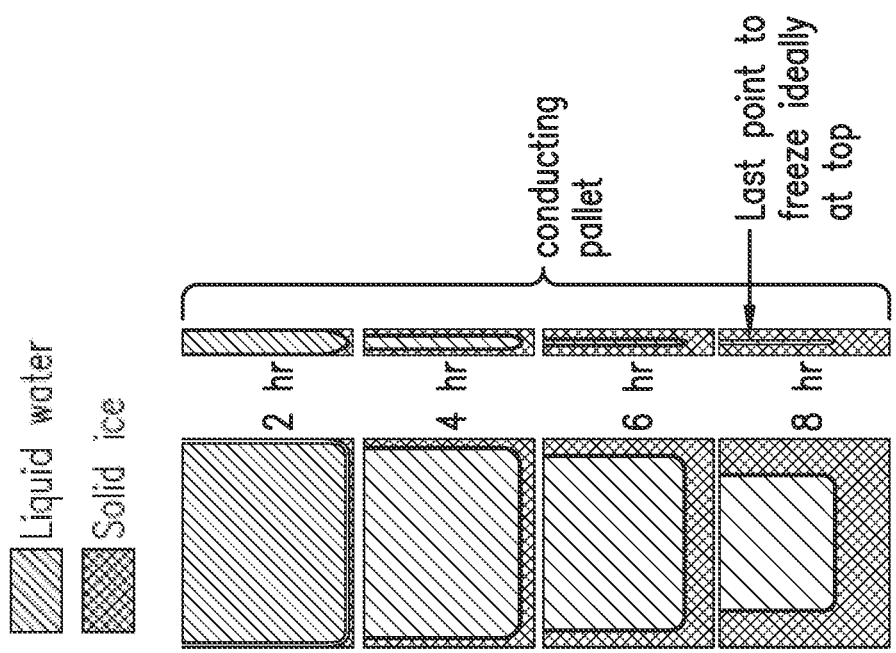
FIG. 5 is a schematic diagram illustrating the progression over time of liquid freezing within a container in accordance with the invention.

Thus, if IBN is significantly greater than 1 (e.g., by an order of magnitude), then heat-transfer via the headspace above the water will strongly predominate and cause the top layer of water to freeze at a significantly faster rate than water is being displaced along the walls of the container, thereby leading to undesirable ice-bridging and an increased likelihood of container rupture. On the other hand, if IBN is significantly less than 1, then heat-transfer will occur predominantly through the walls of the container, and ice-formation will progress generally inwardly and upwardly, as illustrated in FIG. 5, with the last point to freeze being located generally centrally at the top of the solution. This is the preferred dynamic or modality for freezing of the liquid drug solution, as it reduces the likelihood that ice bridging, and hence rupture, will occur.

By modeling the rates of heat-transfer through the walls of the containers and through the headspace above the surface of the liquid as functions of surface areas that are exposed to a cooling medium; flow-rates of the cooling medium past the walls of the container; specific heat capacity of the cooling medium; any effect the thickness and/or material of the walls of the container may have; and other thermodynamic variables that will be apparent to those having skill in the art, suitable dimensions (length, width, height) of containers according to the invention—which dimensions determine surface areas over which freezing occurs—can be determined consistent with the principle that IBN should be substantially less than 1.

By way of example, we have found empirically that the critical value for thin-walled containers (0.15" wall thickness) we have been working with is approximately 0.6. Presumably, however, the actual critical value for a given system of containers will depend on container wall-thickness, container shape (i.e., length-to-height ratios), and potentially other factors.

Figure 6:
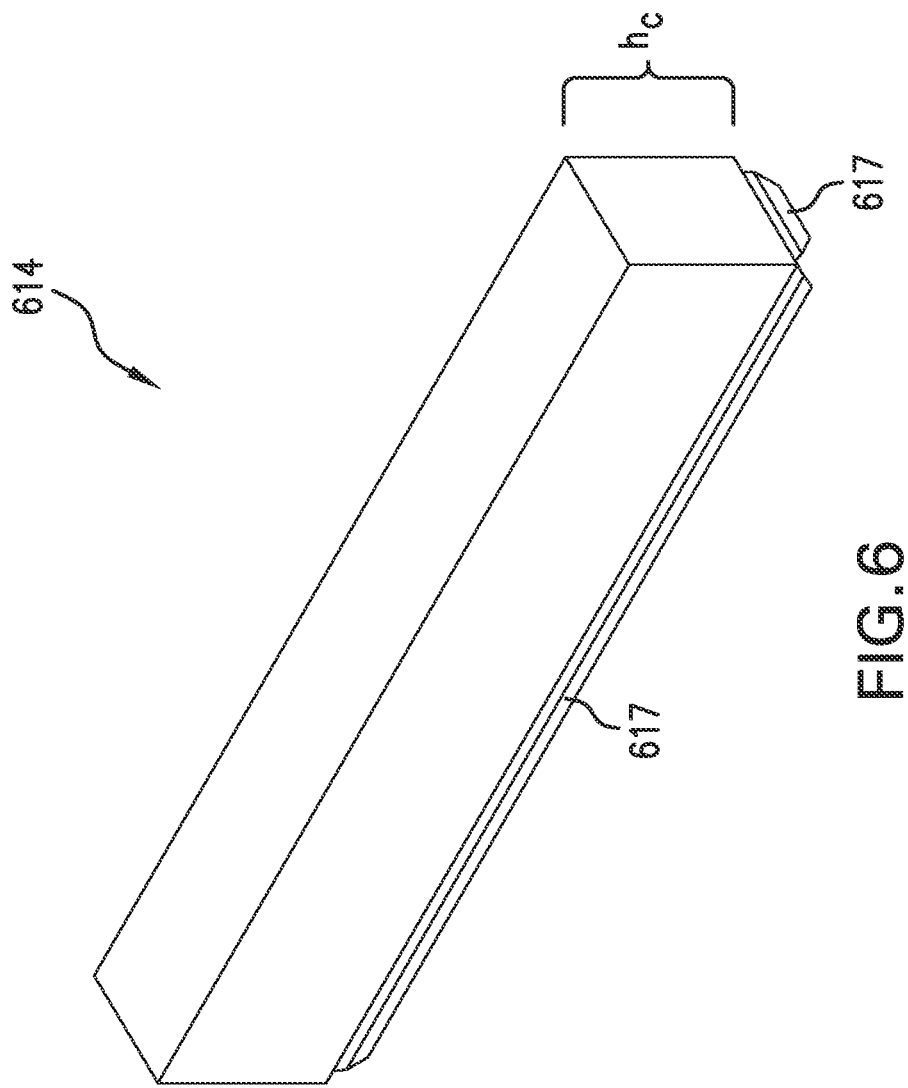
FIG. 6 is a perspective view of a headspace-insulating shroud for use in accordance with a container according to the invention.

Furthermore, to reduce the amount of heat transfer out of the liquid product that occurs through the headspace, thereby further reducing the risk of ice-bridging, it may be useful to cover the upper portion of each of the containers with an insulating shroud or cap 614, illustrated in FIG. 6, once the containers have been filled and prior to freezing of the liquid product. The shroud or cap 614 may be fabricated from insulating material such as high-density polyethylene or other plastic or foam material, which has low thermal conductivity. The height $h_c$ of the cap may be essentially the same as the height of the unfilled headspace that exists in the container when the container is filled to its particular, specified amount, while the length and width of the shroud 614 may suitably be slightly larger than the length and width of a corresponding container with which the shroud 614 is designed to be used (e.g., about 0.25 inch longer in each dimension). Furthermore, a flexible sealing lip 617 can be provided around the periphery of the open, lower side of the shroud 614 to engage the walls of the container, thereby at least partially sealing the airspace between the container and the walls of the shroud 614 so as to form an insulating pocket of air around the top of the container that limits heat transfer via the headspace. Use of such a shroud or cap 614 may be particularly important as in practice we have found that IBN is strongly a function of the container headspace (i.e., the amount of heat transfer that occurs through the headspace), and use of a shroud significantly enhances control over freezing behavior.

For example, of the containers that we have found to perform acceptably well in terms of uniform freezing performance across various sizes (or that we believe will perform acceptably well across various sizes), a set may include containers designed to hold nominal volumes of 100, 25, and 12.5 liters of fluid. In practice, these containers will have an actual working volume in the freezing process of 75, 16, and 7 liters, respectively. In accordance with the invention, all such containers suitably may be 127 mm (5 inches) wide (inside dimension), so as to provide an essentially uniform freeze-path length across all such containers. As for length, height, and fill levels, a container designed to hold up to 100 liters of fluid may suitably be 1150 mm long and 700 mm high, with a specified fill level of 570 mm and a headspace height 130 mm. A container designed to hold up to 20 liters of fluid suitably may be 560 mm long and 290 mm high, with a specified fill level of 260 mm and a headspace height of 30 mm. Furthermore, smaller containers fabricated from high density polyethylene may have a wall thickness of 3.8 mm (0.15 inch), whereas containers designed to hold 50 liters of fluid or more, also fabricated from high density polyethylene, have a wall thickness of 6.4 mm (0.25 inch) to increase the strength and prevent bowing of the walls due to the increased static pressure of the fluid within the containers. (Such bowing would impede controlled cooling behavior both directly, by causing the freeze path length to vary over the height of the container, and indirectly, by interrupting or interfering with the flow of the cooling medium past the containers at the location of the bowing.)

Figure 7:
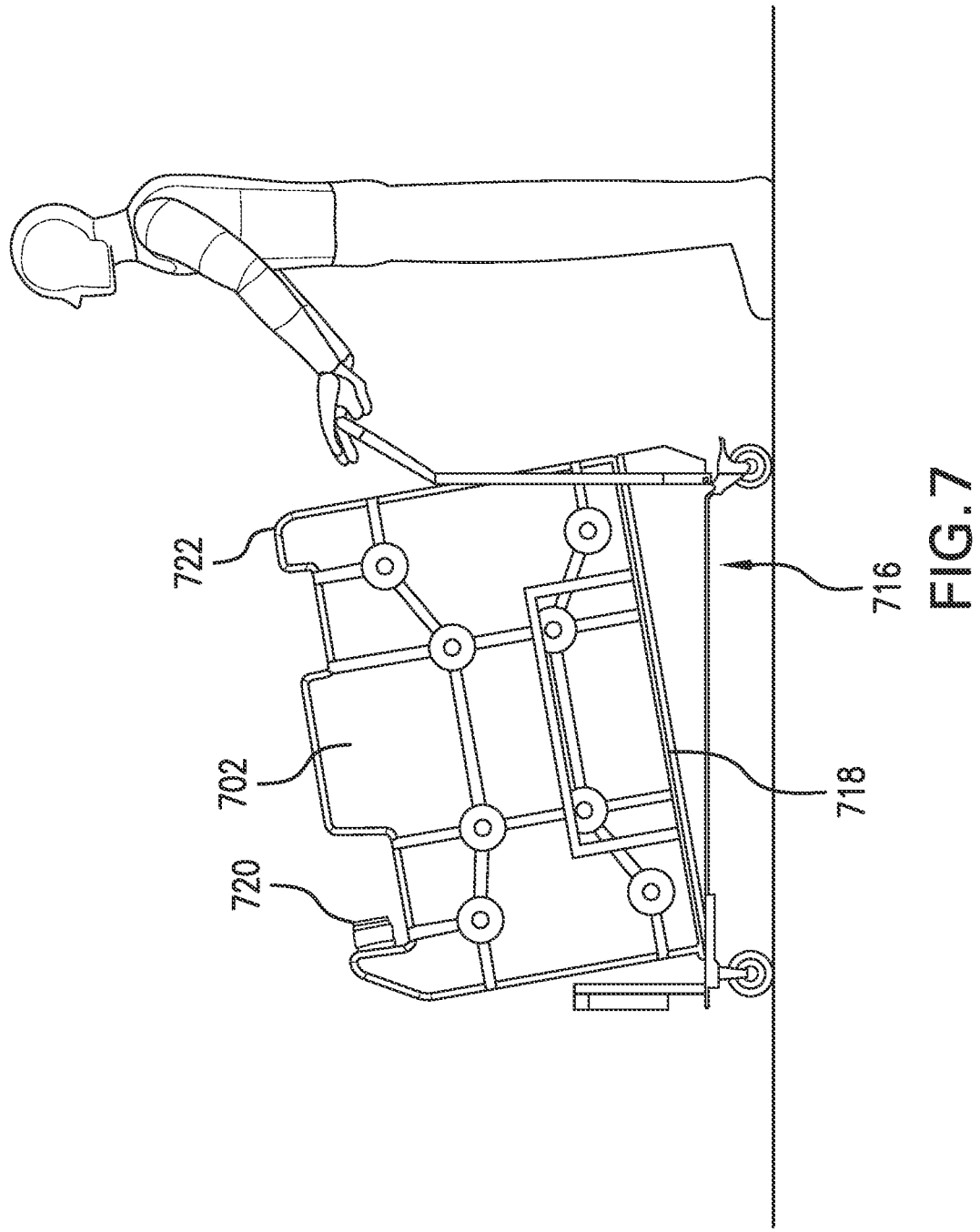
FIG. 7 is a diagrammatic view illustrating containers according to the invention being transported on a wheeled pallet.

Use of containers as per the invention is illustrated in FIGS. 7-8, 9A, 9B, 10-12, and 13A-13C. As illustrated in FIG. 7, a wheeled dolly 716 may be provided to facilitate handling (e.g., filling) of containers 702 per the invention—particularly those having larger volumes. Suitably, the dolly 716 has an inclined support platform 718, which supports the containers 702 at an angle on the order of 10° relative to horizontal. This inclination allows each of the containers 702 to be filled via the fitting 720 at the upper left-hand corner of the container 702, while air inside the container that is displaced by rising liquid can exit through a vent valve (not illustrated) located in the upper right-hand corner 722 of the container 702, which will remain above the surface of the liquid as it rises.

Once the containers have been filled, they may be transferred to a specially configured freezing pallet, as illustrated in FIGS. 8, 9A, 9B, and 10. (As mentioned above, transfer may be effected using a lifting manipulator that has pins, which engage with or extend through the apertures 806 in the containers.) The freezing pallet 826 has a support platform 828, with a number of end-block formations 830 extending from it. Each of the end-block formations has an upright end wall 832 and a pair of sidewalls 834 that are parallel to each other and perpendicular to the end wall 832. Together, the end wall 832 and sidewalls 834 of each end-block formation define a generally U-shaped channel into which a container 802 fits in an upright, standing position. To expedite freezing of the liquid in the containers 802, the support platform 828 and the end-block formations 830 suitably are made from metal with high heat-conductivity, e.g., aluminum, to facilitate heat transfer and freezing at the bottoms of the containers.

To facilitate secure holding of the containers 802, the sidewalls 834 of each end-block formation 830 are spaced apart by a distance that is essentially the same as the width w of the containers, or just a slight bit more. Additionally, pairs of end-block formations 830 are positioned across from each other at opposite ends of the support platform 828, with their end walls 832 spaced apart from each other by a distance that is essentially the same as the length of the containers 802 that are to be supported by the freezing pallet 826 or just a slight bit more. The end-block formations 830 are arranged so that their respective U-shaped channels face each other and define container-receiving "slots" or spaces on the freezing pallet 826.

Figure 8:
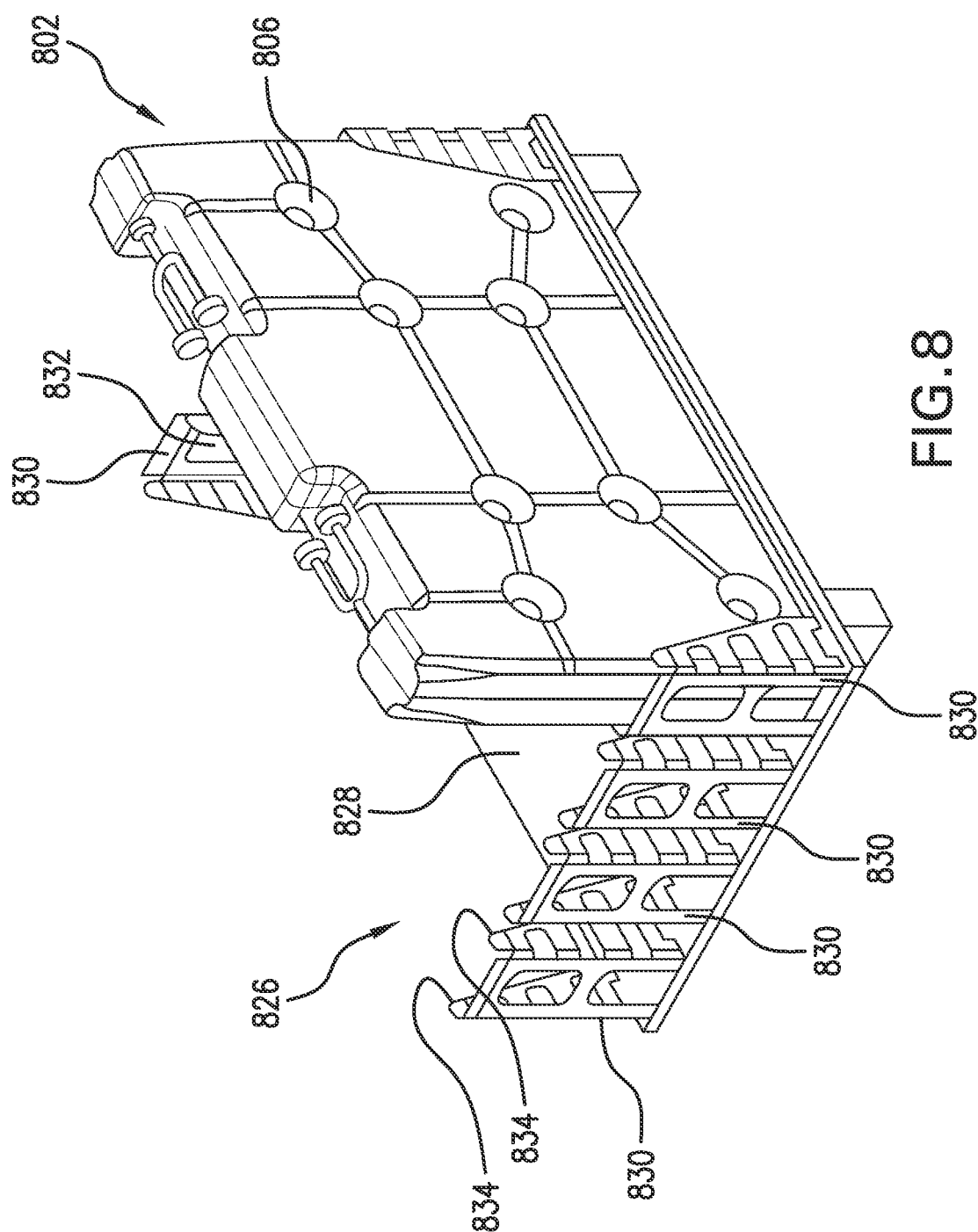
FIGS. 8, 9A, 9B, and 10 are perspective views illustrating containers of various sizes supported on a freezing pallet in accordance with the invention.
Figure 9A:
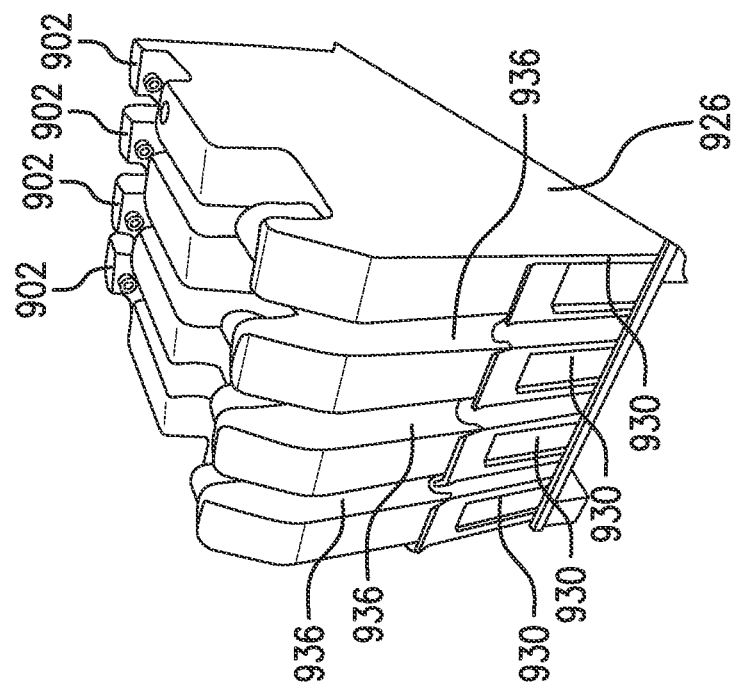
Figure 9B:
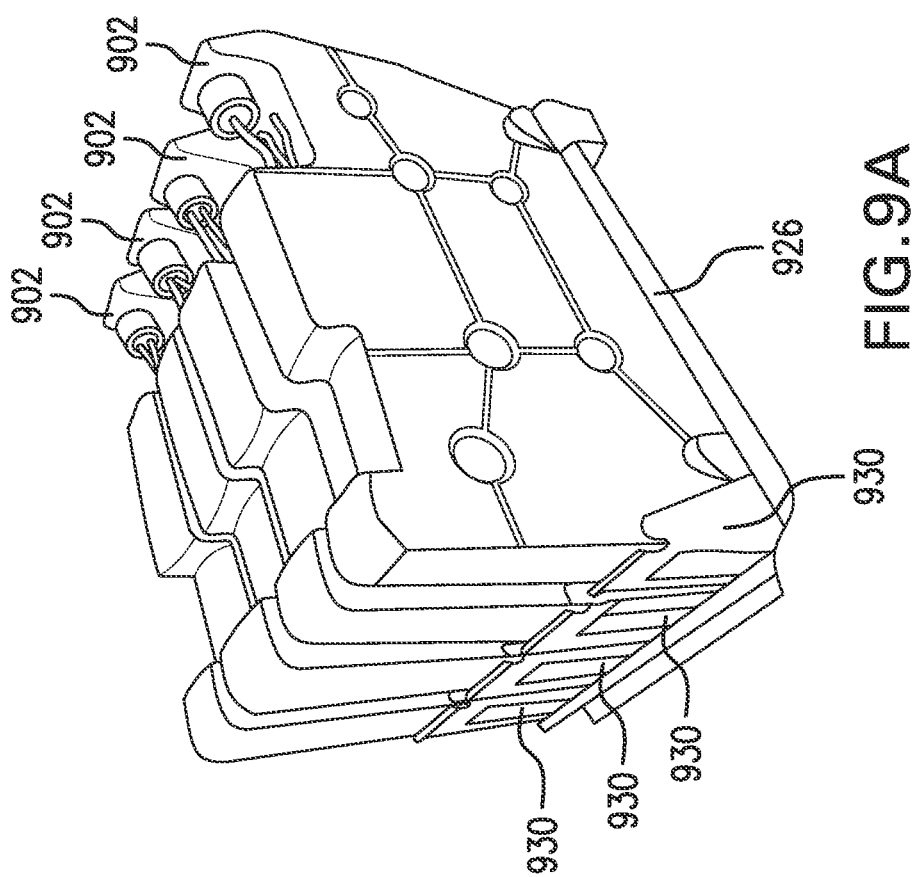

As further illustrated in FIG. 8, and as better illustrated in FIGS. 9A and 9B, the end-block formations 930 are positioned so as to hold adjacent containers 902 equally spaced from each other, i.e., so that the space 936 between adjacent containers is uniform. This is to help ensure uniformity of freezing of the liquid within all containers on a given freezing pallet 926. Furthermore, the inter-container spacing 936 is suitably selected so as not to impede the flow of cooling medium between the containers 902, given flow rates, density, and heat-absorption capabilities of the cooling medium that is to be used.

Figure 10:
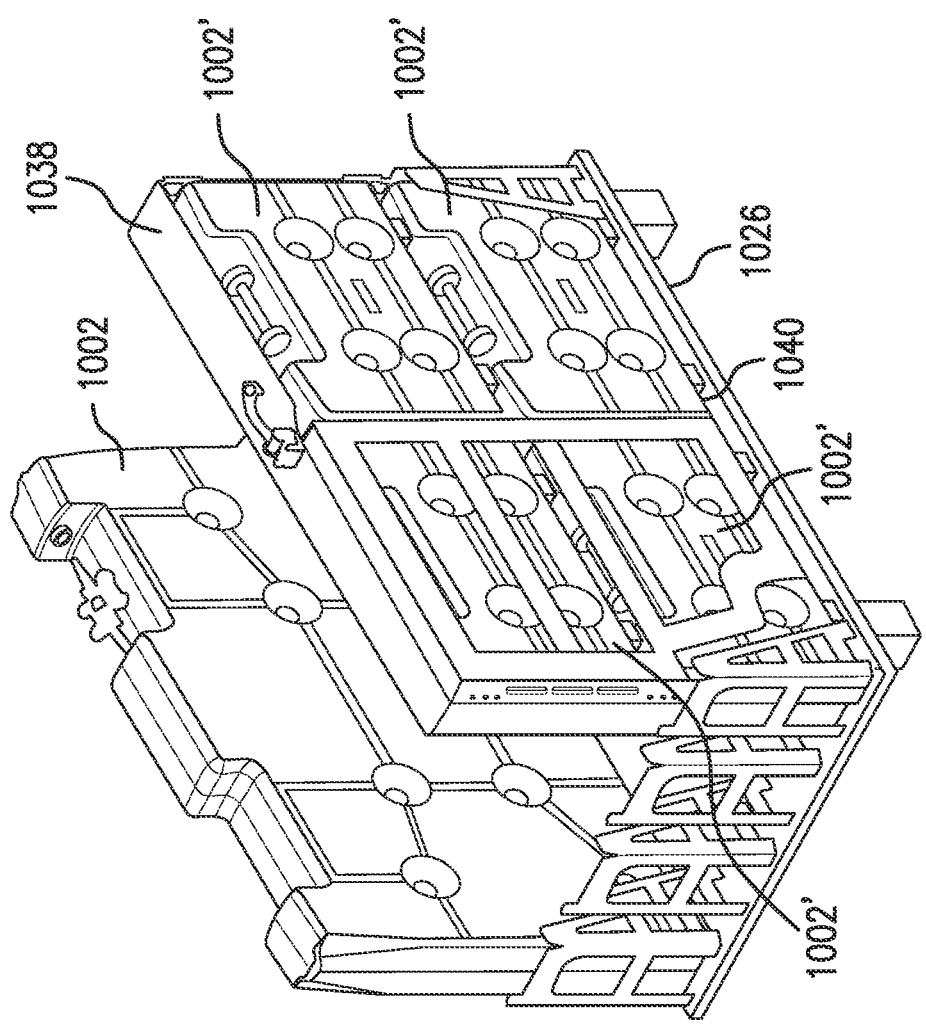
Figure 11:
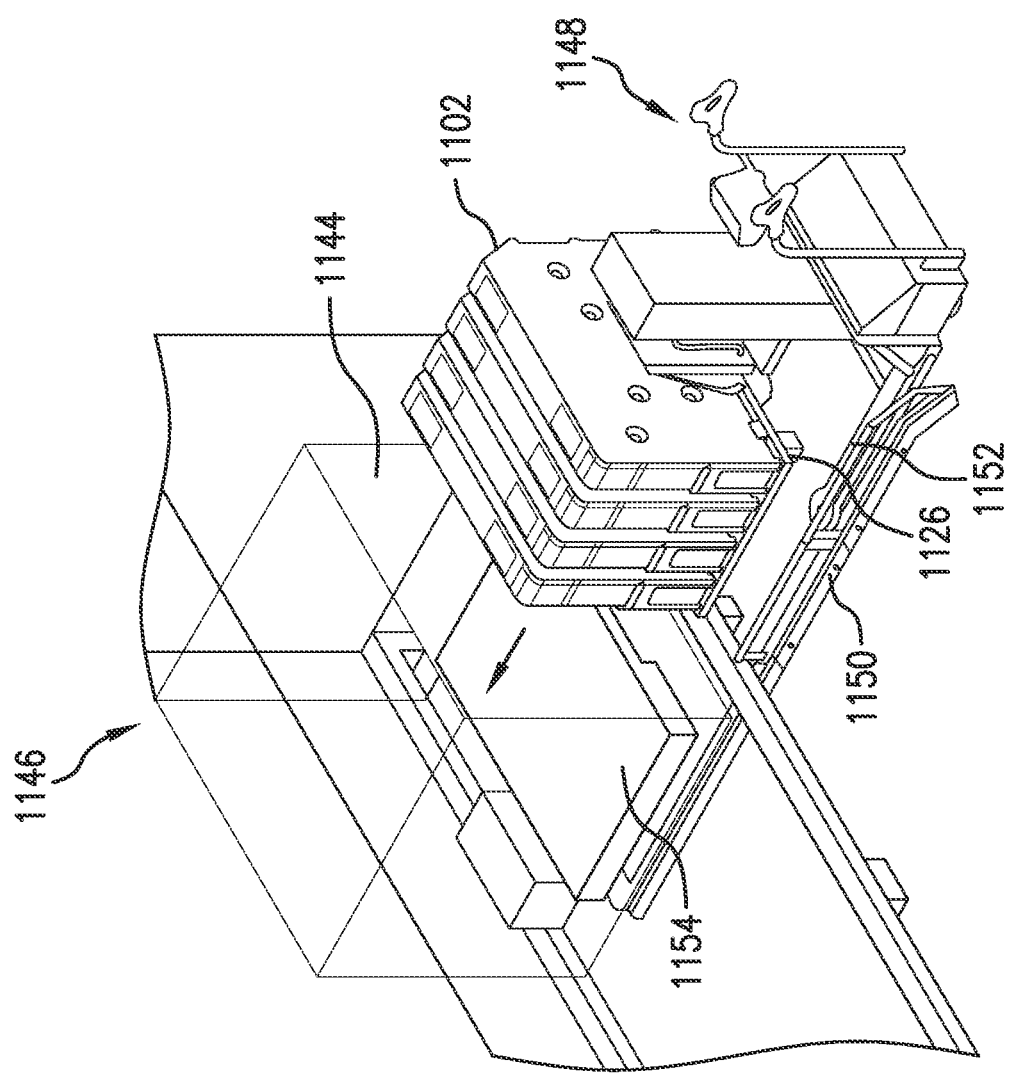
FIG. 11 is a schematic diagram illustrating a pallet of containers being loaded into a blast-freezer in accordance with the invention.

As noted above, the end-block formations are spaced apart from each other so as to define a container-receiving slot that is as long as the containers 802, 902 that are to be frozen, as illustrated in FIGS. 8, 9A, and 9B. As illustrated in FIG. 2 and addressed above, however, multiple smaller containers can be secured together in an arrangement with an overall size and shape that is essentially the same as one of the larger containers. Thus, as illustrated in FIG. 10 by way of example, four smaller containers 1002', each having a length and a height that is one-half the length and height of a larger container 1002 (but the same width w), can be secured together by means of a frame 1038 that surrounds and secures together the four smaller containers 1002'. In particular, the frame 1038 extends around the periphery of the "cassette" formed by all four of the smaller containers 1002', and side enclosure members 1040—only one of which is illustrated in FIG. 10—can be attached to the frame on both sides of the containers to hold them securely in place within the cassette. In this manner, smaller containers of liquid can be frozen using the same freezing pallet 1026 that larger containers use, and different sizes of containers can be frozen at the same time using the same pallet 1026.

Once a freezing pallet has been loaded with containers of liquid to be frozen, the pallet and containers may be transferred into a refrigeration chamber, e.g., the freezing chamber 1144 of a blast freezer 1146 as illustrated in FIGS. 11 and 12A-12C. For example, the container-bearing pallet may be lifted via a mobile pallet-lifting device 1148. The pallet-lifting device is then guided straight toward the freezing chamber 1144 (i.e., in a direction perpendicular to the direction of flow of the cooling medium through the freezing chamber 1144) by means of guide rails 1150 extending from the blast freezer assembly, which guide rails 1150 are engaged by roller-bearing arms 1152 that extend forward from the pallet-lifting device 1148. The freezing pallet 1126, with the containers 1102 supported on it, is then lowered onto supporting platform 1154 within the freezing chamber 1144 and the pallet-lifting device 1148 is backed away from the blast freezer, thereby leaving the containers 1102 in the freezing chamber 1144 with equal space between them.

The freezing chamber is then closed and a cooling medium—e.g., air that typically is cooled to between −20° C. and −80° C. or liquid nitrogen below −80° C. (−20° C. to −196° C.) is circulated within the freezing chamber 1244, as illustrated in FIG. 12. The cooling medium flows between and along the containers 1102, causing the liquid contained therein to freeze in a uniform, well controlled manner. Once the containers have been frozen—the time for complete freezing may be determined empirically and may vary depending on the particular liquid being frozen, the particular cooling medium being used, the temperature of the cooling medium being used, the flow rate of the cooling medium past the containers, and various other factors—they can be removed from the freezing chamber and transferred to cold storage for use later on. 1246 represents a mechanical skid; 1248 represents gaskets; 1250 represents a compression latch with inside release; 1252 represents fan motors; 1254 represents a removable base plate; 1256 represents a steel frame; 1258 represents a sheet metal removable from interior to allow for the removal of the coil and fans; and 1260 represents a fan.

Finally, it should be noted that the uniform width of the containers, which leads to uniform freeze-path length and uniform freezing performance across all containers, will also contribute to uniform thawing performance when the frozen drug product is subsequently to be used. Furthermore, it may be the case that the blast freezer includes heating elements, so that the same apparatus and facilities used to freeze the pharmaceutical material can be used to thaw the frozen pharmaceutical material, by flowing warmed air past the containers.

Figure 13A:
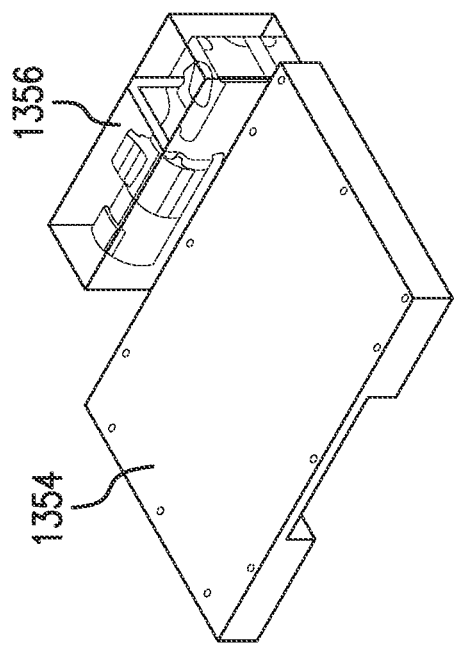
FIG. 13A is a perspective view illustrating a thaw-enhancing rocker assembly, with FIGS. 13B and 13C being side views thereof illustrating the rocker assembly in operation.
Figure 13B:
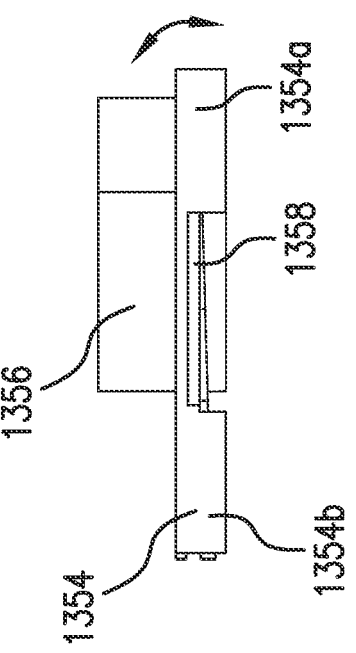
Figure 13C:
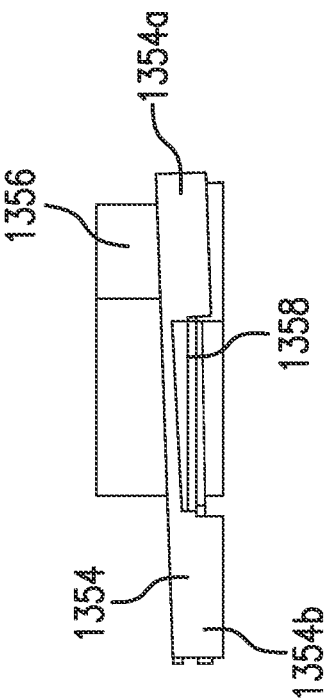

To enhance thawing of the frozen material, it may be desirable to agitate the material inside the containers as it is thawing. For example, as illustrated in FIGS. 13A-13C, a motorized lifting device 1356 may be provided adjacent the container support platform 1354, with a lifting arm 1358 extending beneath the support platform 1354. The lifting device 1356 is positioned such that one end 1354a of the support platform 1354 is raised, e.g., by about 2 inches, while the other end 1354b of the support platform 1354 stays put, with the support platform 1354 pivoting about the end 1354b in a cyclical manner. In this manner, fluid in the containers (not illustrated), which have their lengths oriented left-to-right as the assembly is illustrated in FIGS. 13B and 13C, is caused to slosh back and forth along the lengths of the container as the frozen product thaws. So rocking the containers significantly reduces the time it takes for the containers of product to thaw and helps ensure uniformity of the product within the containers, as well as from container to container, once it has been thawed.

The foregoing disclosure is only intended to be exemplary of the methods and products of the present invention. Departures from and modifications to the disclosed embodiments may occur to those having skill in the art. The scope of the invention is set forth in the following claims.

We claim:

1. A system to produce frozen pharmaceutical product in a plurality of bulk amounts simultaneously, comprising:
    a blast freezer with a refrigeration chamber through which a predetermined cooling medium flows in a predetermined flow direction at a predetermined flow velocity and at a predetermined temperature; and
    a plurality of containers disposed within the refrigeration chamber and each containing an amount of liquid pharmaceutical product to be frozen to produce the frozen pharmaceutical product, with each of the containers having a lengthwise dimension that is aligned with the flow direction and two parallel, major sidewalls that are spaced from each other in a widthwise direction and with the plurality of containers being arranged within the refrigeration chamber so that the cooling medium flows along at least one of the two major sidewalls of each container during freezing operation of the blast freezer, wherein the two major sidewalls of each of the containers in the plurality of containers are spaced from each other by the same distance so that a freeze-path length associated with each of the containers in the plurality of containers is the same, the amount of liquid pharmaceutical product contained in each of the containers being set to be less than a total internal volume of the respective container such that a headspace exists within the container above an upper surface of the liquid pharmaceutical product contained within the container, the total internal volume of at least two of the containers in the plurality of containers differing from each other;
    wherein an ice bridging number (IBN) associated with each of the containers in the plurality of containers is less than 0.6, whereby the liquid pharmaceutical product in a given container tends to freeze within the given container along the major sidewalls of the given container at a faster rate than the liquid pharmaceutical product tends to freeze at an upper surface thereof so that ice-bridging is suppressed;
    the ice bridging number being a dimensionless parameter that A) reflects comparative rates of heat transfer through the headspace above the liquid pharmaceutical product in a given container and through the major sidewalls of the given container with which the liquid pharmaceutical product is in contact and B) that is indicative of relative rates at which water in the liquid pharmaceutical product tends to freeze at the air-liquid interface at the upper surface of the liquid pharmaceutical product in the container and along the major sidewalls of the given container, and
    the IBN for a given container containing liquid pharmaceutical product therein being a function of container dimensions and geometry; heat transfer areas; amount of liquid pharmaceutical product contained within the given container; heat transfer coefficients for the material from which the given container is made, the liquid pharmaceutical product, and the predetermined cooling medium; thermal properties of the pharmaceutical product before and after freezing; and the predetermined flow velocity and predetermined temperature of the predetermined cooling medium.

2. The system according to claim 1, wherein the plurality of containers are all arranged within the refrigeration chamber so that the cooling medium flows along both of the two major sidewalls of each container during freezing operation of the blast freezer.

3. The system according to claim 2, wherein the plurality of containers are all arranged with bottom walls thereof disposed against a heat-conducting metal surface to facilitate heat transfer and freezing of the liquid pharmaceutical product at bottom portions of the containers.

4. The system according to claim 1, further comprising a plurality of insulating shrouds, with one shroud disposed over a top portion of each of the containers in the plurality of containers to insulate, and thereby limit heat transfer through, the headspace in a given container.

5. A system to produce frozen pharmaceutical product in a plurality of bulk amounts simultaneously, comprising:
    a blast freezer with a refrigeration chamber through which a predetermined cooling medium flows in a predetermined flow direction at a predetermined flow velocity and at a predetermined temperature; and
    a plurality of containers disposed within the refrigeration chamber and each containing an amount of liquid pharmaceutical product to be frozen to produce the frozen pharmaceutical product, with each of the containers having a lengthwise dimension that is aligned with the flow direction and two parallel, major sidewalls that are spaced from each other in a widthwise direction and with the plurality of containers being arranged within the refrigeration chamber so that the cooling medium flows along at least one of the two major sidewalls of each container during freezing operation of the blast freezer, wherein the two major sidewalls of each of the containers in the plurality of containers are spaced from each other by the same distance so that a freeze-path length associated with each of the containers in the plurality of containers is the same, the amount of liquid pharmaceutical product contained in each of the containers being set to be less than a total internal volume of the respective container such that a headspace exists within the container above an upper surface of the liquid pharmaceutical product contained within the container, the total internal volume of at least two of the containers in the plurality of containers differing from each other;

wherein an ice bridging number (IBN) associated with each of the containers in the plurality of containers is the same, the ice bridging number being a dimensionless parameter that A) reflects comparative rates of heat transfer through the headspace above the liquid pharmaceutical product in a given container and through the major sidewalls of the given container with which the liquid pharmaceutical product is in contact and B) that is indicative of relative rates at which water in the liquid pharmaceutical product tends to freeze at the air-liquid interface at the upper surface of the liquid pharmaceutical product in the container and along the major sidewalls of the given container, and the IBN for a given container containing liquid pharmaceutical product therein being a function of container dimensions and geometry; heat transfer areas; amount of liquid pharmaceutical product contained within the given container; heat transfer coefficients for the material from which the given container is made, the liquid pharmaceutical product, and the predetermined cooling medium; thermal properties of the pharmaceutical product before and after freezing; and the predetermined flow velocity and predetermined temperature of the predetermined cooling medium.

6. The system according to claim 5, wherein the plurality of containers are all arranged within the refrigeration chamber so that the cooling medium flows along both of the two major sidewalls of each container during freezing operation of the blast freezer.

7. The system according to claim 6, wherein the plurality of containers are all arranged with bottom walls thereof disposed against a heat-conducting metal surface to facilitate heat transfer and freezing of the liquid pharmaceutical product at bottom portions of the containers.

8. The system according to claim 5, further comprising a plurality of insulating shrouds, with one shroud disposed over a top portion of each of the containers in the plurality of containers to insulate, and thereby limit heat transfer through, the headspace in a given container.

9. A system to produce frozen pharmaceutical product in a plurality of bulk amounts simultaneously, comprising:
a blast freezer with a refrigeration chamber through which a predetermined cooling medium flows in a predetermined flow direction at a predetermined flow velocity and at a predetermined temperature; and
a plurality of containers disposed within the refrigeration chamber and each containing an amount of liquid pharmaceutical product to be frozen to produce the frozen pharmaceutical product, with each of the containers having a lengthwise dimension that is aligned with the flow direction and two parallel, major sidewalls that are spaced from each other in a widthwise direction and with the plurality of containers being arranged within the refrigeration chamber so that the cooling medium flows along at least one of the two major sidewalls of each container during freezing operation of the blast freezer, wherein the two major sidewalls of each of the containers in the plurality of containers are spaced from each other by the same distance so that a freeze-path length associated with each of the containers in the plurality of containers is the same, the amount of liquid pharmaceutical product contained in each of the containers being set to be less than a total internal volume of the respective container such that a headspace exists within the container above an upper surface of the liquid pharmaceutical product contained within the container, the total internal volume of at least two of the containers in the plurality of containers differing from each other;

wherein an ice bridging number (IBN) associated with each of the containers in the plurality of containers is the same and is less than 0.6, whereby the liquid pharmaceutical product in a given container tends to freeze within the given container along the major sidewalls of the given container at a faster rate than the liquid pharmaceutical product tends to freeze at an upper surface thereof so that ice-bridging is suppressed;

the ice bridging number being a dimensionless parameter that A) reflects comparative rates of heat transfer through the headspace above the liquid pharmaceutical product in a given container and through the major sidewalls of the given container with which the liquid pharmaceutical product is in contact and B) that is indicative of relative rates at which water in the liquid pharmaceutical product tends to freeze at the air-liquid interface at the upper surface of the liquid pharmaceutical product in the container and along the major sidewalls of the given container, and the IBN for a given container containing liquid pharmaceutical product therein being a function of container dimensions and geometry; heat transfer areas; amount of liquid pharmaceutical product contained within the given container; heat transfer coefficients for the material from which the given container is made, the liquid pharmaceutical product, and the predetermined cooling medium; thermal properties of the pharmaceutical product before and after freezing; and the predetermined flow velocity and predetermined temperature of the predetermined cooling medium.

10. The system according to claim 9, wherein the plurality of containers are all arranged within the refrigeration chamber so that the cooling medium flows along both of the two major sidewalls of each container during freezing operation of the blast freezer.

11. The system according to claim 9, wherein the plurality of containers are all arranged with bottom walls thereof disposed against a heat-conducting metal surface to facilitate heat transfer and freezing of the liquid pharmaceutical product at bottom portions of the containers.

12. The system according to claim 9, further comprising a plurality of insulating shrouds, with one shroud disposed over a top portion of each of the containers in the plurality of containers to insulate, and thereby limit heat transfer through, the headspace in a given container.

* * * * *